US010663374B2

(12) United States Patent
Held et al.

(10) Patent No.: US 10,663,374 B2
(45) Date of Patent: May 26, 2020

(54) STATION AND METHOD FOR CHECKING TYRES

(71) Applicant: PIRELLI TYRE S.P.A., Milan (IT)

(72) Inventors: Alessandro Held, Milan (IT); Vincenzo Boffa, Milan (IT); Bartolomeo Montrucchio, Turin (IT)

(73) Assignee: PIRELLI TYRE S.P.A., Milan (IT)

( * ) Notice: Subject to any disclaimer, the term of this patent is extended or adjusted under 35 U.S.C. 154(b) by 140 days.

(21) Appl. No.: 15/772,804

(22) PCT Filed: Dec. 20, 2016

(86) PCT No.: PCT/IB2016/057812
§ 371 (c)(1),
(2) Date: May 1, 2018

(87) PCT Pub. No.: WO2017/109689
PCT Pub. Date: Jun. 29, 2017

(65) Prior Publication Data
US 2018/0321114 A1 Nov. 8, 2018

(30) Foreign Application Priority Data
Dec. 22, 2015 (IT) .................. 102015000086670

(51) Int. Cl.
*G01M 17/02* (2006.01)
*G01N 21/952* (2006.01)
(Continued)

(52) U.S. Cl.
CPC ........... *G01M 17/027* (2013.01); *G01B 11/24* (2013.01); *G01N 21/8851* (2013.01);
(Continued)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 6,388,819 B1    5/2002  Leidig
7,103,460 B1 *  9/2006  Breed ................. B60C 23/0408
                                                  701/29.1
(Continued)

FOREIGN PATENT DOCUMENTS

CN        202486402 U    10/2012
CN        104541145 A     4/2015
(Continued)

OTHER PUBLICATIONS

International Search Report and Written Opinion for International Application No. PCT/IB2016/057812 filed Dec. 20, 2016 on behalf of Pirelli Tyre S.P.A. dated Mar. 30, 2017. 9 pages.
(Continued)

*Primary Examiner* — Andre J Allen
(74) *Attorney, Agent, or Firm* — Steinfl + Bruno LLP

(57) ABSTRACT

Apparatus and method for checking tyres in a tyre production line. The apparatus includes a support frame for mounting the tyre, a flange for attaching the support frame to a movement member, and an acquisition system for acquiring digital images of a surface of the tyre. The acquisition system includes a linear camera and an illumination system for illuminating an objective line of the camera. The illumination system includes a light source and an optical lens system having a second optical axis. The optical lens system includes first and second converging lenses arranged on the side opposite the light source with respect to the first lens so that the light source, the first lens and the second lens are coaxial with the second optical axis.

32 Claims, 6 Drawing Sheets

(51) Int. Cl.
- *G01B 11/24* (2006.01)
- *G01N 21/88* (2006.01)
- *G01N 21/954* (2006.01)
- *G06T 7/00* (2017.01)
- *G01N 21/95* (2006.01)

(52) U.S. Cl.
CPC ......... *G01N 21/952* (2013.01); *G01N 21/954* (2013.01); *G06T 7/0004* (2013.01); *G01N 21/95* (2013.01); *G01N 2021/8887* (2013.01)

(58) Field of Classification Search
CPC ...... G01M 17/024; G01M 17/10; G01M 7/08; G01M 17/0076; G01M 17/013; G01M 17/03; G01M 17/04; G01M 17/06; G01M 17/08; G01M 1/02; G01M 1/045; G01M 1/12; G01M 1/225; G01M 3/40; G01M 5/0091; G01M 7/02; G01M 99/00; G01M 99/002; B60C 23/0494; B60C 2019/004; B60C 19/00; B60C 23/0493; B60C 23/04; B60C 23/0498; B60C 23/0496; B60C 23/064; B60C 23/0408; B60C 23/041; B60C 23/0411; B60C 23/0488; B60C 23/20; B60C 11/243; B60C 11/246; B60C 23/06; B60C 23/0486; B60C 23/061; B60C 99/00; B60C 11/0083; B60C 13/003; B60C 2009/2038; B60C 23/00; B60C 23/003; B60C 23/004; B60C 23/02; B60C 23/0401; B60C 23/0406; B60C 23/0416; B60C 23/0433; B60C 23/0455; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/001; B60C 23/007; B60C 23/008; B60C 23/0413; B60C 23/0427; B60C 23/0447; B60C 23/0454; B60C 23/0459; B60C 23/0462; B60C 23/0467; B60C 23/0471; B60C 23/0472; B60C 23/0474; B60C 23/0476; B60C 23/0484; B60C 23/065; B60C 23/066; B60C 23/10; B60C 25/0548; B60C 25/056; B60C 25/132; B60C 25/138; B60C 25/18; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 7,269,997 B2 | 9/2007 | Dale et al. | |
| 9,007,701 B2 | 4/2015 | Hsu et al. | |
| 9,835,524 B2 | 12/2017 | Boffa et al. | |
| 2004/0212795 A1 | 10/2004 | Steinbichler et al. | |
| 2008/0216567 A1* | 9/2008 | Breed | B60C 11/24 73/146.5 |
| 2008/0218742 A1* | 9/2008 | Sakoda | G01M 17/027 356/73 |
| 2009/0040533 A1* | 2/2009 | Takahashi | G01B 11/2522 356/612 |
| 2016/0377556 A1* | 12/2016 | Boffa | G01M 17/027 356/237.2 |

FOREIGN PATENT DOCUMENTS

| | | |
|---|---|---|
| CX | 1997870 A | 7/2007 |
| EP | 1120640 A1 | 8/2001 |
| WO | 2012/040584 A1 | 3/2012 |
| WO | 2014/020485 A1 | 2/2014 |
| WO | 2015/004587 A1 | 1/2015 |

OTHER PUBLICATIONS

Chinese Office Action issued by China National Intellectual Property for Chinese Application No. 201680073594.6 dated Nov. 4, 2019, 11 pages. (Partial English Translation + Original).

\* cited by examiner

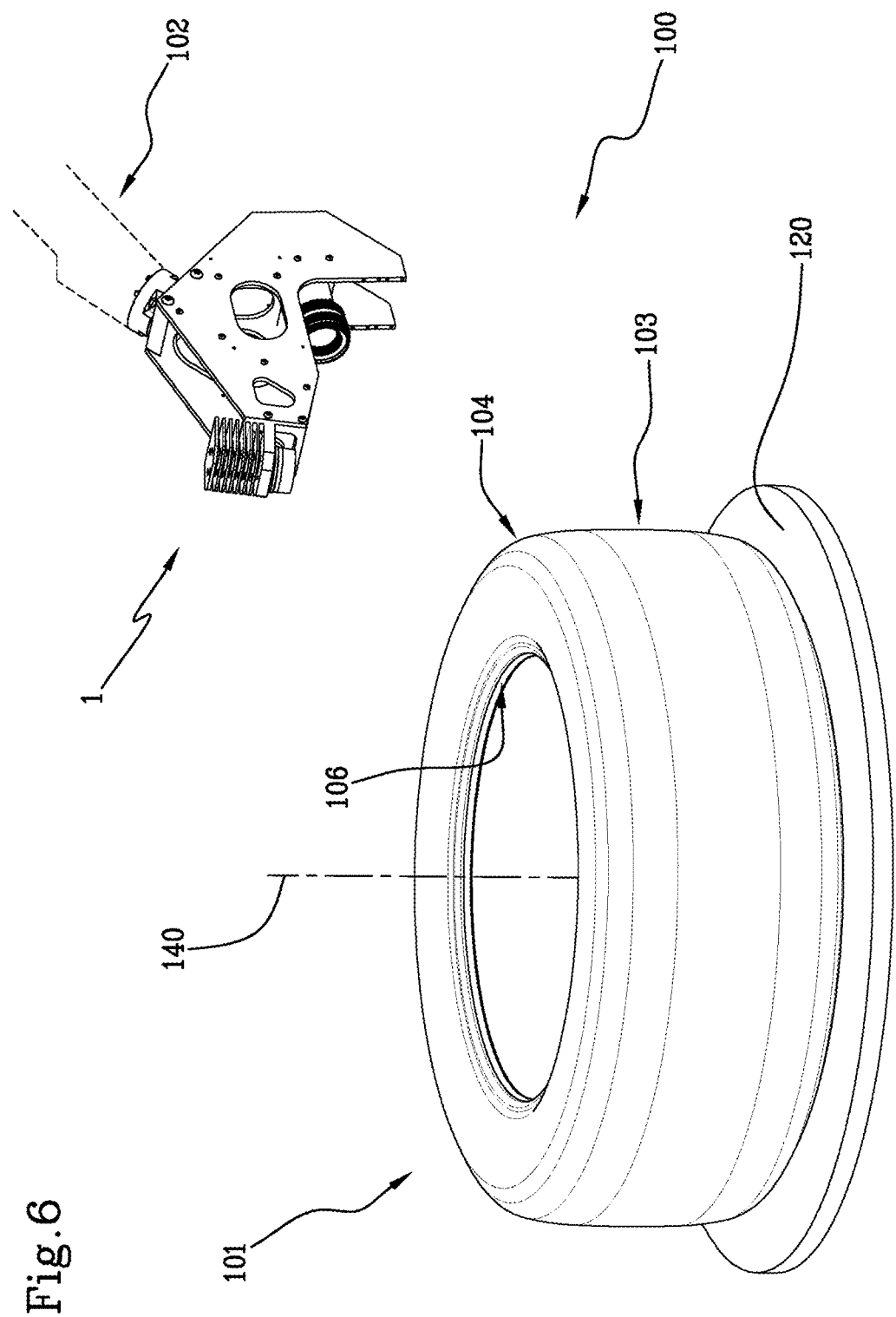

STATION AND METHOD FOR CHECKING TYRES

CROSS-REFERENCE TO RELATED APPLICATIONS

The present application is the U.S. National Stage of International Patent Application No. PCT/IB2016/057812 filed on Dec. 20, 2016 which, in turn, claims priority to Italian Patent Application No. 102015000086670 filed on Dec. 22, 2015.

The present invention relates to a station and a method for checking the surface of tyres, in particular suitable for being inserted in a tyre production line in order to detect any defects consisting of circumferential cuts on the bead surface and/or twisted cords emerging into a tyre groove.

"Tyre" typically means the finished tyre, i.e. after the building, moulding and vulcanisation steps, but possibly also the green tyre after the building step and before the moulding and/or vulcanisation.

Typically, a tyre has a substantially toroidal structure around an axis of rotation of the same during operation, and has an axial middle line plane orthogonal to the axis of rotation, said plane typically being a geometrical substantial symmetry plane, ignoring any minor asymmetries, such as a tread pattern and/or the inner structure.

A tyre for vehicle wheels generally comprises a carcass ply having respectively opposite end flaps engaged with respective annular anchoring structures, usually referred to as "bead cores", integrated in the end circular portions of the tyre, radially inner and substantially orthogonal to the rotation axis, usually identified by the name of "beads" and having an inner diameter substantially corresponding to a so-called "fitting diameter" of the tyre on a respective mounting rim. A layer of an airtight elastomeric mixture (so-called 'liner') and/or a layer of material with sealing properties may typically be provided in a position radially inner to the carcass ply. One or more belt layers, arranged in radial superposition with respect to each other and with respect to the carcass ply, having textile or metallic reinforcing cords, may be associated in a position radially outer to the carcass ply. A tread band is applied in a position radially outer to the belt layers. Respective side inserts of elastomeric material are further applied on the lateral surfaces of the carcass ply, each extending from one of the circular end edges of the tread band up at the respective annular anchoring structure to the beads.

Outer or inner surface of the tyre denote the surface which remains visible after the coupling of the tyre with the mounting rim thereof and the one no longer visible after said coupling, respectively.

The terms 'optical', 'light' and the like refer to an electromagnetic radiation used that has at least a portion of the spectrum falling in a widened neighbourhood of the optical band, and not necessarily strictly falling within the optical band (i.e. 400 -700 nm), for example this widened neighbourhood of the optical band may range from ultraviolet to infrared (for example, a wavelength of between about 100 nm and about 1 μm).

"Telecentric illumination system' means an illumination system adapted to emit a beam of parallel light rays.

"Quasi-telecentric illumination system' means an illumination system adapted to emit a beam of light rays which form an angle that is less than or equal to 15°.

"Digital image", or equivalently "image", generally means a set of data, typically contained in a computer file, in which each tuple of coordinates (typically each pair of coordinates) of a finite set (typically two-dimensional and matrix, i.e. N rows×M columns) of tuples of spatial coordinates (each tuple corresponding to a pixel) is associated with a corresponding set of numerical values (which may be representative of different magnitudes). For example, in monochrome images (such as those in grey levels or 'greyscale'), such a set of values consists of a single value in a finite scale (typically 256 levels or tones), this value for example being representative of the luminosity (or intensity) level of the respective tuple of spatial coordinates when displayed. A further example is represented by colour images, in which the set of values represents the luminosity level of a plurality of colours or channels, typically the primary colours (for example red, green and blue in RGB coding and cyan, magenta, yellow and black in CMYK coding). The term 'image' does not necessarily imply the actual display of the same.

Any reference to a specific "digital image" (for example, the digital image initially acquired on the tyre) includes more generally any digital image obtainable through one or more digital processing of said specific digital image (such as, for example, filtering, equalization, smoothing, binarisation, thresholding, morphological transformations (opening, etc.), derivative or integral calculations, etc.).

The term "two-dimensional image" or "2D" means a digital image each pixel of which is associated to information representative of the reflectivity/diffusivity and/or colour of the surface, such as the images detected from the common cameras or digital cameras (e.g. CCD).

"Digital camera" or in short "camera" denotes an optoelectronic device adapted to acquire a two-dimensional digital image and including a digital image sensor (or in short 'sensor'), which defines an image plane, and an objective (which is assumed to be with cylindrical symmetry, although the invention is not limited only to these objectives).

"Optical axis" of an objective, an optical lens or in general an optical lens system, is the straight line along which there is a symmetry of rotation of the objective or lens or optical lens system. The adjective 'axial' means along the direction of the optical axis.

'Sensor' means a set of photosensitive elements (called 'pixels') capable of transforming the incident light into an electric signal, for example by CCD or CMOS technology. The term pixel is used to denote both the single photosensitive element of the sensor, and by extension the single element forming the digital image as defined above, each pixel of the sensor typically corresponding to a pixel of the image.

"Linear camera" means a camera whose sensor (referred to as 'linear sensor') has the pixels arranged in a rectangular matrix having a dimension much greater than the other, typically greater by at least two orders of magnitude. Typically, the number of rows of pixels of the sensor is between 1 and 4 and the number of columns is greater than 1000. The terms 'rows' and 'columns' are conventionally used and are interchangeable. A linear camera is characterised by an objective line, lying on the intersection between the focal plane of the camera and the plane (referred to as 'optical plane') orthogonal thereto and secant (in the direction of its main dimension) the linear sensor, and is adapted to acquire images of linear surface portions arranged at the objective line (referred to as 'linear images' and having dimensions in pixels equal to the dimensions of the linear sensor).

"Surface linear portion" means a surface portion having a dimension size much greater than the other dimension orthogonal thereto, typically greater by at least two orders of magnitude. The minor dimension of the linear surface portion is typically less than or equal to 0.1 mm.

"Focal plane" of a camera means is the plane of object points that are focused by the objective on the sensor, i.e. the rays originating from each object point of the focal plane converge in a respective point on the sensor plane (image plane).

"Depth of field" means the set of planes in a neighbourhood of the focal plane each point of which, when projected by the objective on the sensor plane, forms an image inscribed in a predetermined circle of confusion (for example having a diameter of 5-10 microns).

'Focal length' of a lens it refers to the distance, along the optical axis, from the optical centre of the lens from the point (referred to as 'focal point') in which all the rays impinging on the lens parallel to the optical axis converge.

'Front focal length' and 'back focal length' of a lens is the distance, along the optical axis, of the respective focal point from the respective vertex of the lens, considering the two half-spaces divided by a plane orthogonal to the optical axis of the lens and passing through the optical centre of the lens.

The term "in proximity to the objective line" means that a linear surface portion lies substantially parallel (i.e. within an angle of +/−15°) to the objective line and within the depth of field of a camera.

'Vertex' means the point of intersection of a refractive surface of a lens with the respective optical axis, even when such a surface is flat.

"Numerical aperture" of a lens is the sine of the angular semi-aperture multiplied by the refractive index of the means in which the lens operates, which herein is assumed to be equal to 1. Angular aperture means the apparent angle of the lens aperture viewed from the focal point, which may be expressed as twice the arctangent of the ratio between the radius of the lens (or more precisely, the radius of the lens aperture) and the focal length.

"Aperture" of a lens refers to the free cross-section for the light rays passing through the lens.

The adjective "back", referred to the optical properties of a lens (such as the focal length or a vertex), means the half-space, as defined by a plane orthogonal to the optical axis and passing through the lens, in which in the light source lies, while the adjective "front" refers to the opposite half-space. In the context of the production and building processes of tyres for vehicle wheels, it is suitable to perform quality inspections on finished products, with the aim to prevent defective tyres or tyres not meeting the project specifications from being put on the market, and/or to progressively adjust the apparatuses and machinery used so as to improve and optimise the execution of the operations carried out in the production process.

These quality inspections include for example those performed by human operators who dedicate a fixed time to a visual and tactile inspection of the tyre; if, in the light of his own experience and sensitivity, the operator were to suspect that the tyre does not meet certain quality standards, the same tyre is subjected to further inspections, through a more detailed human inspection and/or suitable equipment in order to deepen the evaluation of any structural and/or qualitative deficiencies.

The Applicant has observed that for the inspection to be used "in line" within a plant for the production of tyres, the inspection itself should be performed in a reduced time and with reduced costs and/or overall dimensions.

In the field of tyre quality control in a production line, the Applicant has set itself the problem of analysing the surface of the tyre by the optical acquisition of digital images thereof and subsequent processing thereof, in order to detect the possible presence of defects on, or in the vicinity of, the surface.

In this context, the Applicant has realised that particularly important defects which at the same time are difficult to be identified are circumferential cuts on the bead and/or twisted cords emerging on the tread.

'Emerging twisted cord' is a defect (typically at a bottom area of the tread grooves) in which a textile or metal cord, for example at 0 degrees, "emerges" from the elastomeric material, thereby being exposed to air due to the total lack of elastomeric material on top of it or (more typically) whose presence is visible underneath the elastomeric material since the material thickness is too thin compared to the desired one. In this case, the elastomeric material on the cord has a "twisted" pattern (hence the name). Document WO2014/020485 describes a method and an apparatus for detecting defects comprising a twisted cord emerging on a surface of a tyre.

In this context, the Applicant has realised that, also due to the poor reflectivity of the black elastomeric compound, it is appropriate to have a very high optical energy density on the surface and, also, as much as possible concentrated around the surface portion to be acquired (typically a linear surface portion) in order to prevent undesired scattering of light from the surrounding surface portions, which worsens the contrast of the acquired image. Moreover, the lighting must be sufficiently homogeneous on all the linear portion to be acquired to prevent over- and/or under-exposure.

All is complicated by the fact that the light incident on the linear surface portion to detect the above defects is preferably grazing.

The Applicant, in the above context, has therefore posed the problem of implementing a station able to detect the above defects with high reliability and/or sensitivity, while maintaining the same simple in structure and/or operations, and/or cost-effective as a whole.

The Applicant has perceived that an arrangement comprising a light source and an optical lens system comprising several lenses can, by collecting substantially the whole light emitted by the source, properly illuminate the surface portions to be checked, thereby solving the above drawbacks.

The Applicant has finally found that by using a light source (preferably incoherent, i.e. non-laser) coupled to an 'asymmetric' optical capacitor, i.e. an optical lens system of condensation of the light emitted by the light source and comprising two different lenses, one has a simple and practical solution for the use required. In fact, the presence of a first converging lens, proximal to the high numerical aperture source, and a second converging lens, distal from the source, with the diameter larger than the first lens, where the axial distance between the light source and the first lens is less than or equal to the focal distance of the first lens, makes the first lens, with high numerical aperture, collect substantially all the light emitted by the light source (which typically, for example in the case of LEDs, is not punctiform and emits on a very large emission cone) while the second lens, of larger diameter, is able to collect all the light beam that exits from the first lens, although such a beam exits the first lens slightly diverging.

According to a first aspect thereof, the invention relates to a station for checking tyres in a tyre production line.

Preferably, a support is provided, adapted to support the tyre set on a sidewall and to rotate the tyre around an axis of rotation thereof.

Preferably, an apparatus and a movement member of said apparatus are provided.

Preferably, said apparatus comprises a support frame.

Preferably, said apparatus comprises a flange for attaching said support frame to said movement member.

Preferably, said apparatus comprises an acquisition system for acquiring digital images of a surface of said tyre, the acquisition system being mounted on said support frame.

Preferably, said digital image acquisition system comprises a linear camera having a first optical axis, an optical plane, a focal plane and an objective line belonging to the focal plane and to the optical plane.

Preferably, said digital image acquisition system comprises an illumination system adapted to illuminate at least said objective line.

Preferably, the illumination system comprises a light source and an optical lens system having a second optical axis.

Preferably, the optical lens system comprises a first converging lens, proximal to the light source, and a second converging lens, arranged on the side opposite the light source with respect to the first lens.

Preferably, the light source, the first lens and the second lens are coaxial with said second optical axis.

Preferably, the first lens has a numerical aperture greater than or equal to 0.5.

Preferably, an aperture of said second lens is greater than an aperture of said first lens.

According to a second aspect thereof, the invention relates to a method for checking tyres by means of a system for acquiring digital images of a surface of said tyre.

Preferably, said acquisition system comprises a linear camera having a first optical axis, an optical plane, a focal plane and an objective line belonging to the focal plane and to the optical plane.

Preferably, said acquisition system comprises an illumination system adapted to illuminate at least said objective line.

Preferably, the illumination system comprises a light source and an optical lens system having a second optical axis.

Preferably, the optical lens system comprises a first converging lens, proximal to the light source, and a second converging lens, arranged on the side opposite the light source with respect to the first lens.

Preferably, the light source, the first lens and the second lens are coaxial with said second optical axis.

Preferably, the first lens has a numerical aperture greater than or equal to 0.5.

Preferably, an aperture of said second lens is greater than an aperture of said first lens.

Preferably, it is provided to arrange a tyre to be checked having a surface and move said acquisition system close to said tyre.

Preferably, it is provided to rotate said tyre with respect to said acquisition system in a manner such that distinct linear surface portions of the tyre are successively situated in proximity to the objective line.

Preferably, it is provided to successively acquire, by means of said acquisition system, a series of respective linear images of said distinct linear surface portions in order to obtain an image of a circumferential surface region via combination of said series of linear images.

According to a further aspect thereof, the invention relates to an acquisition system of digital images of a tyre surface.

Preferably, a linear camera is provided, having a first optical axis, an optical plane, a focal plane and an objective line belonging to the focal plane and to the optical plane.

Preferably, an illumination system is provided, adapted to illuminate at least said objective line.

Preferably, the illumination system comprises a light source and an optical lens system having a second optical axis.

Preferably, the optical lens system comprises a first converging lens, proximal to the light source, and a second converging lens, arranged on the side opposite the light source with respect to the first lens.

Preferably, the light source, the first lens and the second lens are coaxial with said second optical axis.

Preferably, the first lens has a numerical aperture greater than or equal to 0.5.

Preferably, an aperture of said second lens is greater than an aperture of said first lens.

The Applicant believes that, even in the presence of a non-point-like light source with a large emission cone, the high numerical aperture of the first lens allows the latter to be able to greatly reduce the divergence of the beam of rays emitted by the light source (which, for example for a LED, is of at least 120°), although not all the rays exit parallel to the second optical axis. Therefore, a beam of light comes out of the first lens containing a substantial part of the optical power of the light source, and slightly diverging. The second converging lens intervenes on this beam, which having an aperture (e.g. diameter) greater than the aperture of the first lens, is able to collect substantially all the diverging beam exiting from the first lens. The second lens therefore refocuses the rays in a plane (which is the image plane of the emitting surface of the light source) whose axial distance from the front vertex of the second lens depends on the position of the light source with respect to the first lens. Therefore, a light beam with high luminous density and low divergence (quasi-telecentric) is generated in an axial region before and/or after such an image plane, especially adapted to illuminate the objective line in a homogeneous and localized manner.

The present invention, in at least one of the above aspects thereof, may exhibit one or more of the preferred features described hereinafter.

Preferably, the light source has an overall emitting surface inscribed in a circle with diameter less than or equal to 10 mm. In this way, the light source is sufficiently small so that the first lens may be able to collect and condense the light beam.

Preferably, the maximum circle inscribed in the overall emitting surface has a diameter greater than or equal to 3 mm. In this way, the light source is sufficiently powerful. If in fact it may be preferable to have a point-like source from the point of view of the optical condenser operation, on a practical level it is preferable to select the above minimal dimension in order to have a sufficient optical power.

Preferably, said light source has an emitting surface with optical power density greater than or equal to 0.3 W/mm$^2$. In this way, sufficient light power of the beam is obtained even with the above small dimensions of the light source.

Preferably, the light source is adapted to emit incoherent light. In other words it is not laser light, which according to the Applicant could give rise to 'speckle' phenomena on the tyre surface and/or safety problems related to the required optical power.

Preferably, the light source is an LED (light emitting diode) source. Such incoherent source in fact has high power density, although it emits a high divergence beam (120° and more). As explained above, however, the present invention allows condense substantially all of the optical power of this type of source.

Preferably, the light source has a circular emitting surface. In this way, the cylindrical symmetry of the optical lens system is better used.

Preferably, the first lens has a numerical aperture greater than or equal to 0.6. In this way, the emitted light portion collected by the optical lens system is further increased.

Preferably, said aperture of the first lens has a diameter greater than or equal to 15 mm, more preferably greater than or equal to 20 mm.

Preferably, said aperture of the first lens has a diameter smaller than or equal to 35 mm, more preferably smaller than or equal to 30 mm. In this way, the lens is large enough to collect substantially all the light power and at the same time small enough to make the acquisition system altogether compact and lightweight. This is particularly important when the system is mounted on an apparatus that is moved in space.

Typically, said first lens has a slightly greater physical diameter than said diameter of the aperture, for example 2-3 mm greater.

Preferably, a back focal length of said first lens is smaller than or equal to 20 mm, more preferably smaller than or equal to 15 mm.

Preferably, a back focal length of said first lens is greater than or equal to 7 mm, more preferably greater than or equal to 9 mm. In this way, the acquisition system is altogether compact and lightweight.

Preferably, said first lens is aspherical (i.e. its convex surface is not spherical). In this way, the otherwise strong spherical aberration connected to the high numerical aperture of the lens is mitigated.

Preferably, the second lens has a front focal length greater than or equal to 80 mm, more preferably greater than or equal to 90 mm.

Preferably, the second lens has a front focal length smaller than or equal to 200 mm, more preferably smaller than or equal to 150 mm. In this way, said image plane of the light source lies at a distance from a front vertex of the second lens of about 10-20 cm, keeping a good uniformity of illumination around this area since the beam is quasi-telecentric. Moreover, the illumination system is not too far from the objective line to not create problems of bulk and/or vibration, and also to obtain a high-intensity illumination.

Preferably, the second lens has a numerical aperture smaller than or equal to 0.4, more preferably smaller than or equal to 0.3.

Preferably, said aperture of the second lens has a diameter greater than or equal to 30 mm, more preferably greater than or equal to 35 mm.

Preferably, said aperture of the second lens has a diameter smaller than or equal to 60 mm, more preferably smaller than or equal to 50 mm.

According to the two paragraphs above, the lens is large enough to collect substantially all the light power and at the same time small enough to make the acquisition system altogether compact and lightweight.

Typically, said second lens has a slightly greater physical diameter than said diameter of the aperture, for example 1-2 mm greater.

Preferably, the second lens has at least one spherical surface.

Preferably, the spherical surface of the second lens has a radius of curvature greater than or equal to 40 mm.

Preferably, the second lens has a radius of curvature smaller than or equal to 60 mm.

Preferably, the second lens is a plan-convex lens, more preferably with a single convex surface facing said first lens.

Preferably, the first and the second lens are positioned in such a way that respective convex surfaces are mutually facing. In this way, optical aberrations are reduced.

Preferably, a difference between a diameter of said aperture of the second lens and a diameter of said aperture of the first lens is greater than or equal to 40% of the diameter of the aperture of the first lens, more preferably greater than or equal to 50% of the diameter of the aperture of the first lens.

Preferably, a difference between a diameter of said aperture of the second lens and a diameter of said aperture of the first lens is smaller than or equal to 100% of the diameter of the aperture of the first lens.

Preferably, a difference between a diameter of said aperture of the second lens and a diameter of said aperture of the first lens is greater than or equal to 70%, more preferably greater than or equal to 80% of a distance between a rear vertex of the first lens and a rear vertex of the second lens.

Preferably, a difference between a diameter of said aperture of the second lens and a diameter of said aperture of the first lens is smaller than or equal to 130%, more preferably smaller than or equal to 120% of a distance between a rear vertex of the first lens and a rear vertex of the second lens.

According to the four paragraphs above, the fraction of the light beam coming out of the first lens collected by the second lens is maximised.

Preferably, a distance between a rear vertex of the first lens and a rear vertex of the second lens is greater than or equal to 10 mm, more preferably greater than or equal to 12 mm.

Preferably, a distance between a rear vertex of the first lens and a rear vertex of the second lens is smaller than or equal to 20 mm, more preferably smaller than or equal to 16 mm. This in order to reduce the overall dimensions and weight of the condenser.

Preferably, said distance between the two vertices is fixed.

Preferably, the illumination system comprises a system for regulating an axial distance between said light source and said first lens. In this way, it is possible to adjust the position of the image plane and/or adjust the amount of light collected by the lens system.

Preferably, an axial distance between said light source and a rear vertex of said first lens is less than or equal to a rear focal length of said first lens.

The fact that the light source is on the focus of the first lens or closer to the first lens than its rear focal length causes a high percentage of the beams emitted by the source to impinge on the first lens. The second lens refocuses the beams in an image plane lying at an axial distance from the front vertex of the second lens greater than or equal to the front focal length of the second lens.

Preferably, a difference between said rear focal length and said axial distance between the light source and the rear vertex of the first lens is greater than or equal to 5% of said rear focal length, more preferably greater than or equal to 8% of said rear focal length.

Preferably, a difference between said rear focal length and said axial distance between the light source and the rear vertex of the first lens is smaller than or equal to 30% of said rear focal length, more preferably smaller than or equal to 20% of said rear focal length. In this way, in addition to making the illumination system compact, the collection of the light radiation by the first lens is optimised.

Preferably, an axial distance between a front vertex of the second lens and a point of intersection between said second optical axis and said focal plane (typically a camera focal point that is located on an intersection of said first optical axis with said focal plane and around which the objective line develops) is smaller than a front focal length of said second lens.

Preferably, the illumination system defines an image plane of the light source lying at an axial distance from a front vertex of said second lens greater than or equal to a front focal length of the second lens.

Preferably, a point of intersection between said image plane and said second optical axis and a point of intersection between said second optical axis and said focal plane lie at least 20 mm from each other, more preferably at least 30 mm.

In this way, the image plane that is beyond the front focal length, is also beyond the camera's focal plane, in proximity of which the linear surface portion lies. It is thus prevented to focus the image of the light source on the illuminated surface, which would lead to the reproduction of the fine structure of the LED source, which is highly inhomogeneous in light intensity since the LED itself has lighter points and darker points. On the contrary, the surface portion is illuminated with a quasi-telecentric and 'out of focus' beam, where inhomogeneities are 'smoothed', thereby improving the lighting uniformity.

Preferably, said objective line (which is typically symmetric with respect to the focal point) and/or each of said linear surface portions, is at least 40 mm, more preferably at least 50 mm.

Preferably, said second optical axis intersects said first optical axis and/or said objective line, more preferably it passes through said focal point.

Preferably, said second optical axis forms an acute angle with said optical plane smaller than or equal to 15° in absolute value, more preferably it lies on said optical plane. Advantageously, the projected light is thus centred with respect to the objective line.

Preferably, said second optical axis forms an acute angle with said focal plane greater than or equal to 7°, more preferably greater than or equal to 9°.

Preferably, said second optical axis forms an acute angle with said focal plane smaller than or equal to 20°, more preferably smaller than or equal to In this way advantageously, when in use a linear surface portion lies on or in proximity to the objective line, the projected light is very close to the surface line framed by the camera, thus enhancing in the acquired image the shadows at reliefs and depressions on the surface, as in the case of presence of emerging twisted cords or circumferential cuts. Moreover, when the latter feature is combined with the feature of the previous third paragraph, the light beam is almost parallel to the framed surface line, thus allowing reliefs on the surface to be detected that are arranged transversely to the objective line. For example, when the linear surface portion is arranged substantially axially, the twisted cords, which have a substantially circumferential pattern, or the circumferential cuts are transverse to the objective line.

Preferably, said axis of rotation of the tyre is arranged vertically.

Preferably, said movement member of the apparatus is a robot arm.

Preferably, said movement member of the apparatus is an anthropomorphic robot arm.

More preferably, said anthropomorphic robot arm has at least 5 axes/degrees of freedom.

Preferably, said circumferential surface region is a circumferential region of external surface, more preferably it is a circumferential region of external surface of a shoulder and/or tread of said tyre.

Preferably, said first optical axis is arranged substantially radially with respect to the tyre.

In this way, the acquisition system is able to detect emerging twisted cords.

Preferably, said circumferential surface region is a circumferential region of external surface, more preferably it is a circumferential region of external surface of a bead of said tyre.

In this way, the acquisition system is able to detect circumferential cuts.

Further features and advantages will become more apparent from the detailed description of some exemplary but non-limiting embodiments of a station, a method and an apparatus for checking tyres in a tyre production line, according to the present invention. Such description will be given hereinafter with reference to the accompanying figures, provided only for illustrative and, therefore, non-limiting purposes, in which.

Figure 5:
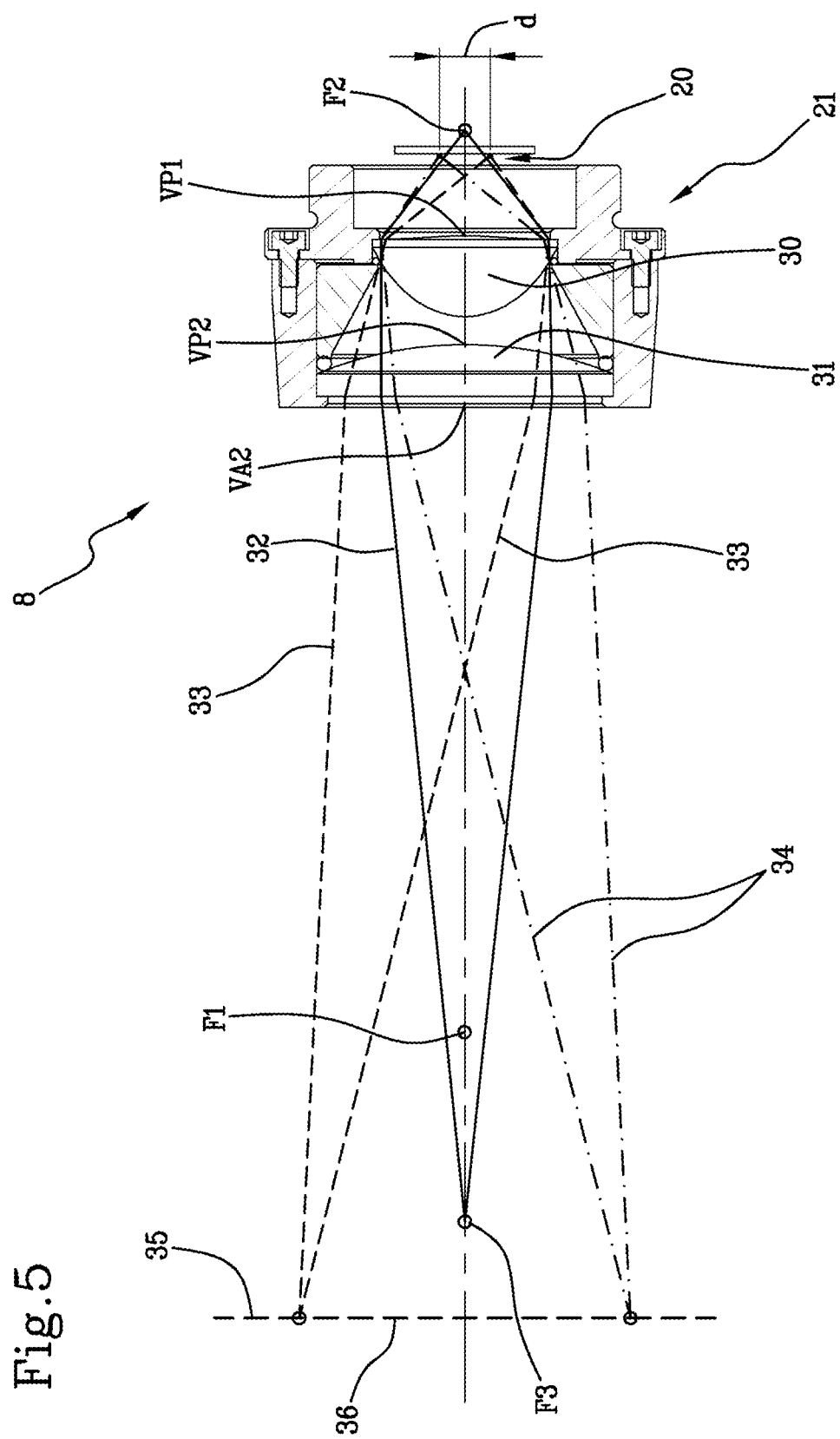

FIG. 5 schematically shows a possible optical configuration of the illumination system according to the present invention;

FIG. 6 shows a schematic and partial view of a station for checking tyres according to the present invention.

With reference to FIG. 6, reference numeral 100 indicates a station for checking tyres in a tyre production line.

Preferably, the station comprises a support 120 (for example a fifth wheel) adapted to support tyre 101 set on a sidewall and to rotate the tyre around a rotation axis 140 thereof (preferably arranged vertically). The tyre comprises tread 103, shoulders 104 and beads 106.

Station 100 comprises an apparatus 1 for checking tyres.

Preferably, the station comprises a movement member 102 (only shown schematically) on which apparatus 1 is mounted for the movement thereof in space. Preferably, the movement member of the apparatus is a robot arm, preferably anthropomorphic. Even more preferably, said anthropomorphic robot arm has at least 5 axes/degrees of freedom.

Apparatus 1 comprises a support frame 2 and a flange 3 for attaching the support frame 2 to the movement member 102.

Preferably, apparatus 1 comprises an acquisition system 4 of digital images of the tyre surface mounted, the acquisition system being rigidly mounted on the support frame 2.

Figure 3:
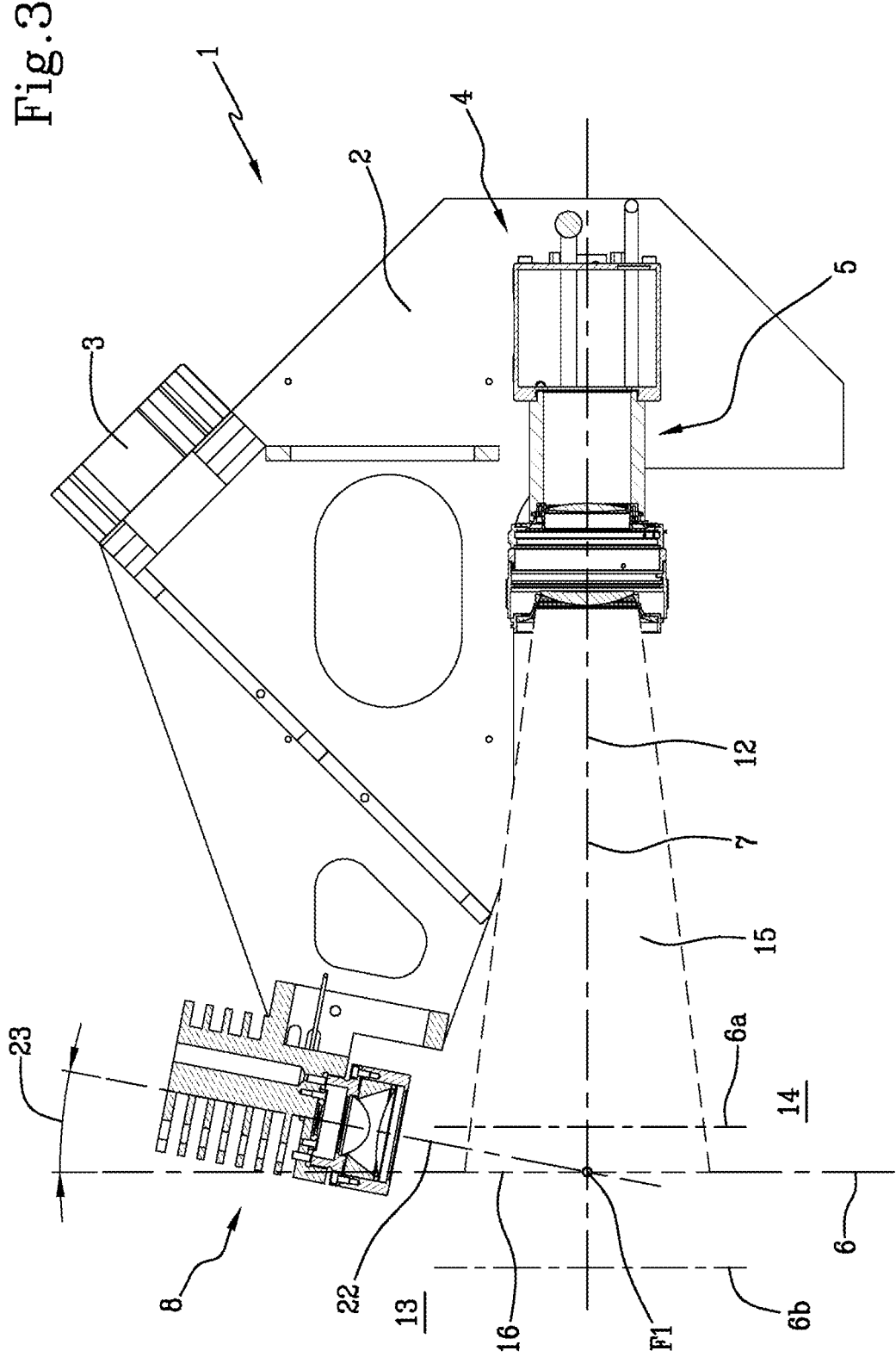
FIG. 3 shows a partial and schematic sectional view of the apparatus in FIG. 1 along the section plane 11.
Figure 4:
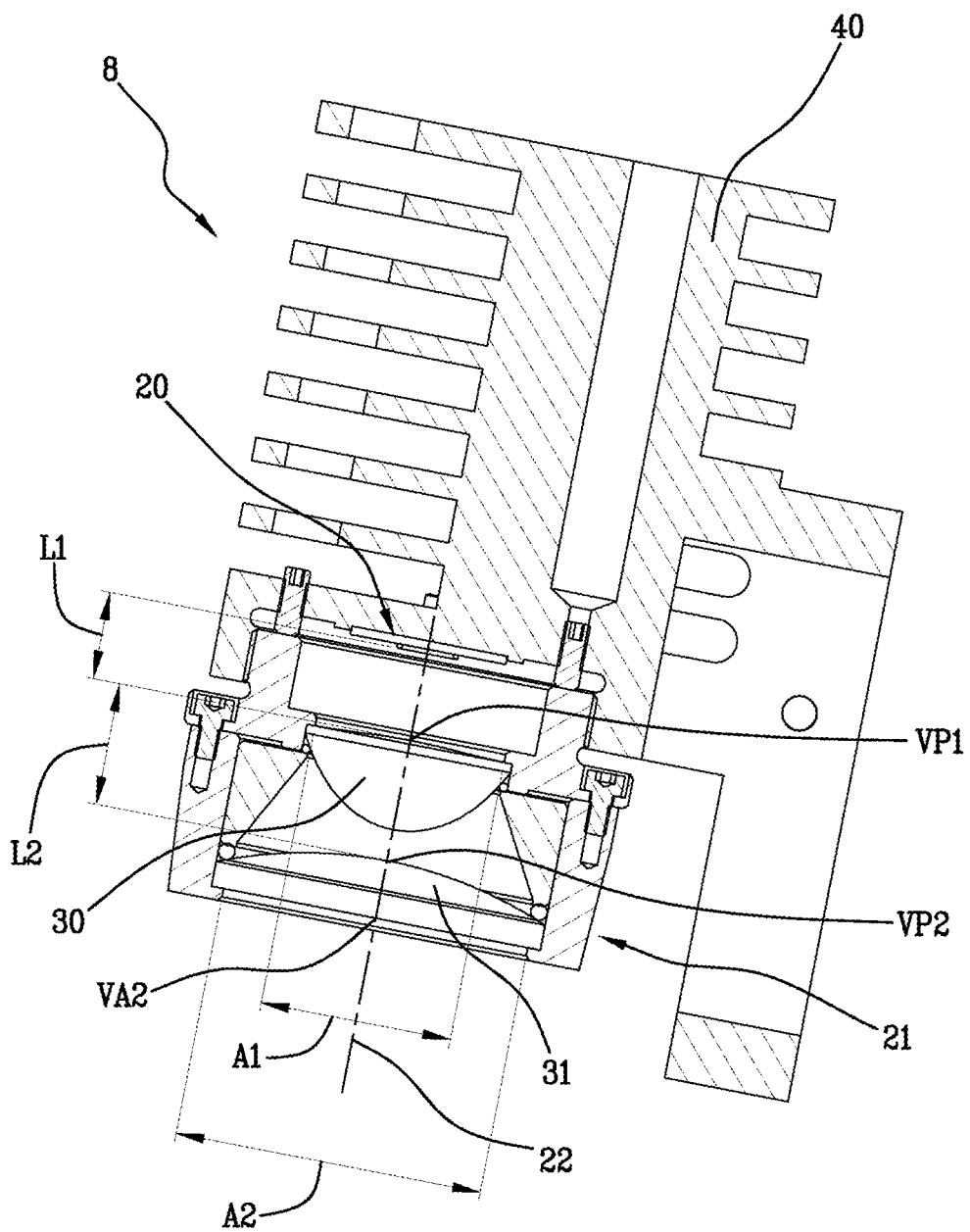
FIG. 4 shows a detail of FIG. 3.

Preferably, the acquisition system 4 comprises a camera 5, having a focal plane 6 and a first optical axis 7 and an illumination system 8 adapted to illuminate at least one focal point F1 placed on the intersection of the focal plane 6 with the first optical axis 7. FIG. 3 shows traces 6a and 6b of the end planes of the depth of field of camera 5.

Figure 1:
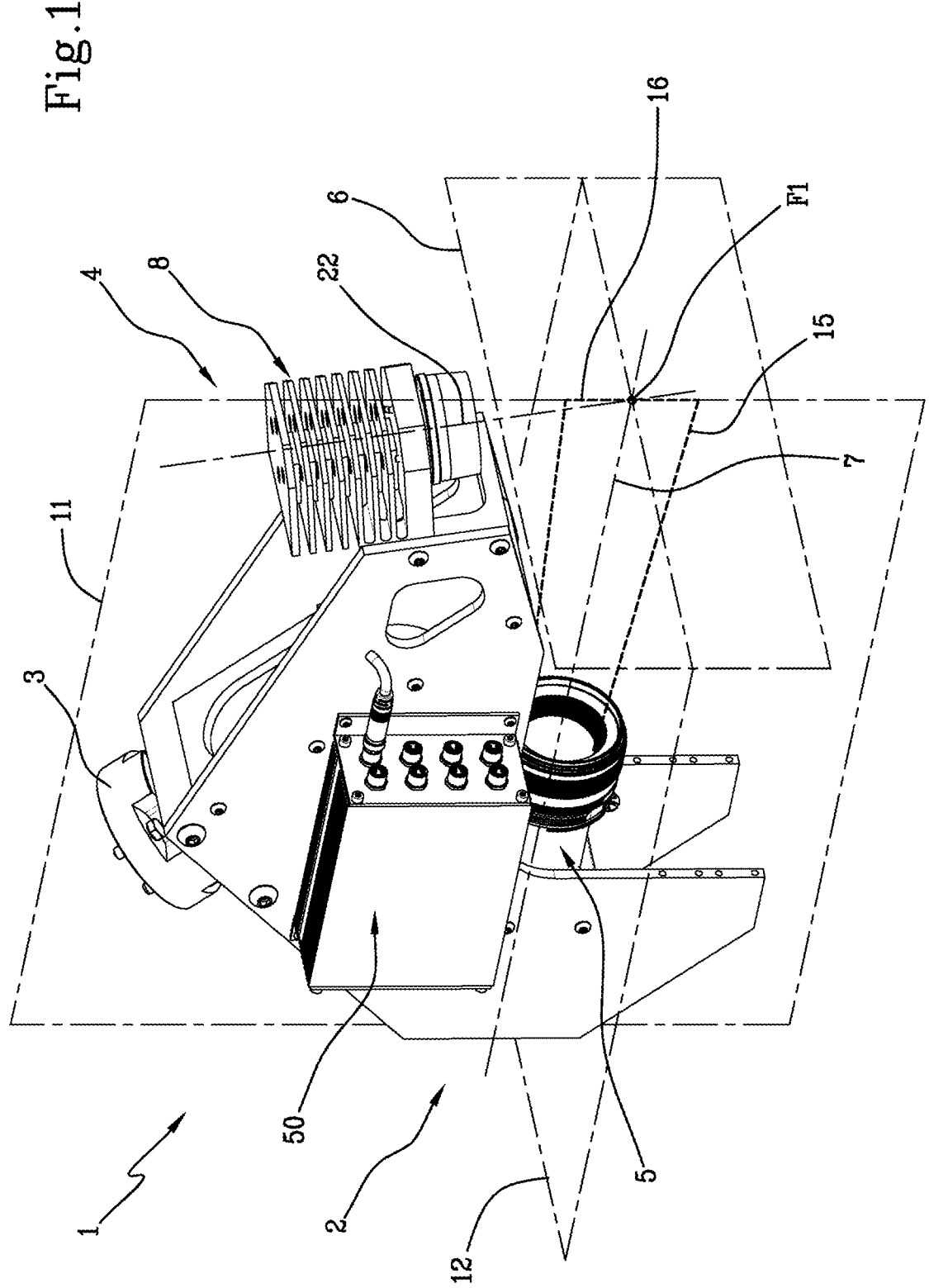
FIG. 1 shows a partial and schematic perspective view of an apparatus for checking tyres according to the present invention.
Figure 2:
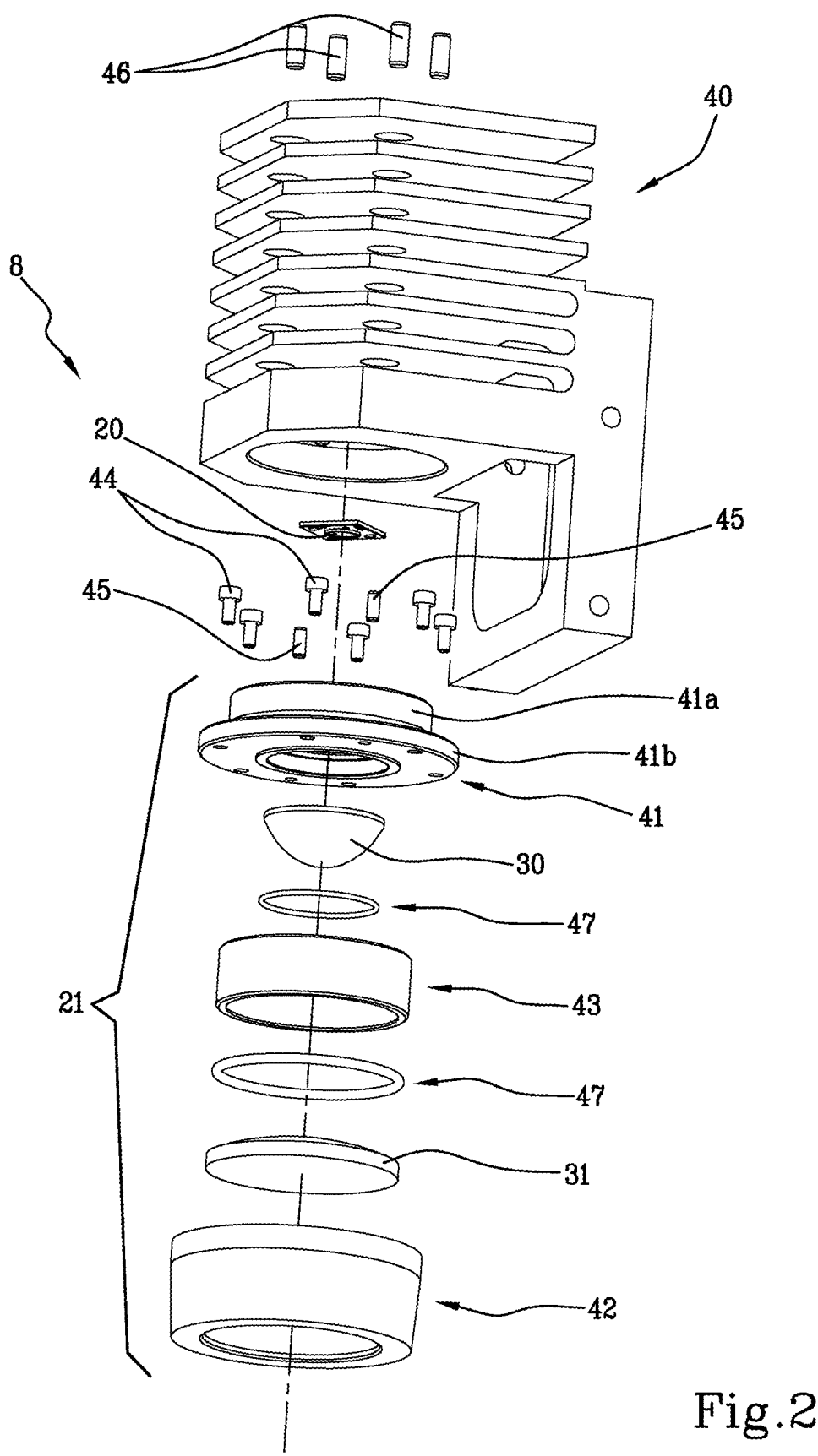
FIG. 2 shows a partial and schematic exploded view of the illumination system of the apparatus in FIG. 1.

The acquisition system 4 is a high resolution two-dimensional image acquisition system. Preferably, camera 5 is a linear camera having an optical plane 15 (lying on the section plane 11 in FIG. 1) and an objective line 16 belonging to the intersection of the focal plane 6 with the optical plane 15, comprising the focal point F1 and having a predetermined length. For example, the length of the objective line 16, which in practice corresponds to the field framed by the camera, can range from 30 mm to 200 mm.

Preferably, the illumination system 8 is a quasi-telecentric illumination system.

Preferably, the illumination system 8 comprises a light source 20 and an optical lens system 21 having a second optical axis 22.

Exemplarily, the second optical axis 22 forms an acute angle 23 with the focal plane 6 equal to 11°.

Exemplarily, the second optical axis 22 intersects the objective line 16 in the focal point F1.

Exemplarily, the second optic axis 22 lies on the optical plane 15.

Preferably, the optical lens system 21 comprises a first converging lens 30 proximal to the light source and a second converging lens 31 arranged opposite the light source with respect to the first lens, where the light source, the first lens and the second lens are coaxial to the second optical axis.

Exemplarily, the first lens and the second lens have the following features.

First Lens:
  Aspherical lens
  Physical diameter (mm) 25.0
  Free aperture diameter (mm) 23.0
  Back focal length (mm) 11.2
  Numerical aperture 0.71
  Maximum thickness in the middle (mm) 10.8
  Thickness at the edge (mm) 1.0
Second Lens
  Plano-convex lens
  Physical diameter (mm) 40.0
  Free aperture diameter (mm) 39.0
  Front focal length (mm) 95.5
  Radius of the spherical convex surface (mm) 52.3
  Maximum thickness in the middle (mm) 7.0
  Thickness at the edge (mm) 3.0
  Numerical aperture 0.20

Exemplarily, the first lens is a 66-013 lens and the second lens is a 48-240 lens, both marketed by Edmund Optics Inc.

Preferably, the first and the second lens are positioned in such a way that respective convex surfaces are mutually facing.

Preferably, both lenses have antireflecting treated surfaces in order to avoid losing a part of the light output (for example, about 4% of power for each surface).

Preferably, the light source 20 is a LED source having a circular emitting surface with diameter d for example equal to 6 mm and with an optical power density exemplarily equal to 0.44 W/mm$^2$.

Exemplarily, the axial distance L1 between the light source and a back vertex VP1 of the first lens is equal to 10.4 mm.

Exemplarily, the axial distance L2 between the back vertex VP1 of the first lens and the back vertex VP2 of the second lens is equal to about 14 mm.

FIG. 5 schematically shows, for illustrative purposes only, a possible optical configuration of the illumination system.

For the purposes of clarity, the optical refraction action of the lens is considered as if it occurs all on the back surface of the first lens and on the front one of the second lens.

F2 indicates the back focus of the first lens and F3 indicates the front focus of the second lens.

The continuous line 32 plots the two edge beams starting from a hypothetical point-like light source placed on the back focus of the first lens and which are collected by the first lens on the edge of the respective aperture. By definition, these edge beams come out from the first lens parallel to the second optical axis and are then focused by the second lens on the front focus F3 of the latter. This is what happens when (not shown) the light source, even not point-like, is located on the focal plane F2. In this case, the image plane is formed on the plane passing through F3.

In the embodiment shown by way of example, where LED 20 is positioned closer to the first lens with respect to focus F2, the beams follow a different route.

The dashed line 33 plots the two edge beams starting from a light point on the edge of the light source 20 and which are collected by the first lens on the edge of the aperture. These beams exit from the first lens and are collected and refocused by the second lens in an image plane 35 by way of example lying at an axial distance from the front vertex VA2 of the second lens greater than or equal to the front focal length of the second lens.

Similarly, the dash-dot line 34 shows edge beams diametrically opposite to the beams of the dashed lines 33.

Therefore, image 36 of the light source is formed on the image plane 35.

As can be seen, for a wide axial region around the image plane 35, the light beam has a high optical density (because almost all of the light emitted is collected) and low divergence.

For example, the F1 camera focal point may be positioned as shown in FIG. 5, namely at a distance from the second lens smaller than the front focal length of the second lens. In this way, at least a substantial part of the objective line is illuminated with uniform light.

The illumination system exemplarily comprises a support body 40 (suitably finned to promote the dispersion of heat generated by the LED), rigidly attached to the support frame 2.

The illumination system exemplarily comprises a first housing body 41, a second housing body 42 and an intermediate body 43 interposed between the two housing bodies 43.

The first housing body 41 comprises a first cylindrical portion 41a facing towards the light source which distances the first lens from the light source.

The outer surface of this first portion 41a is threaded and engages an internally threaded seat of the support body 40. In this way, a system for adjusting the axial distance between the light source and the first lens is achieved. After adjusting the position of the lens optical system 21 with respect to the light source 20 through the threaded coupling, suitable threaded dowels 46 which engage respective threaded holes in the support body 40 are pulled against the first housing body in order to stabilise the assembly.

The light source 20 is exemplarily fixed, for example glued, to the bottom of said internally threaded seat of the support body 40.

The housing body 41 comprises a second portion 41b that externally forms a flange and internally forms a housing seat for the first lens 30. It is noted that the minimum free cross-section of the first housing body (at the bottom of the housing seat) is the optical aperture of the first lens.

The second housing body 42, substantially cylindrical, internally comprises a housing seat for the second lens 31. Suitable screws 44 and centring dowels 45 secure the second housing body to the second flanged portion 41b of the first housing body 41.

The intermediate body 43, having a cylindrical outer surface, is housed in the housing seat of the second housing body 42, in a position interposed between the second lens 31 and the first housing body 41, in order to maintain the second lens 31 at a predetermined distance from the latter.

The inner surface of the intermediate body 43 has a conical development around the second optical axis, consistent with the difference of the two lens apertures.

Suitable O-rings 47 are placed between the lens and the respective housing seats.

The invention claimed is:

1. A station for checking tyres in a tyre production line, comprising:
   a) a support adapted to support a tyre set on a sidewall thereof and to rotate the tyre around a rotation axis thereof;
   b) an apparatus; and
   c) a movement member,
   wherein the apparatus comprises:
      b1) a support frame;
      b2) a flange for attaching said support frame to the movement member; and
      b3) an acquisition system for acquiring digital images of a surface of the tyre mounted on the support frame, the acquisition system comprising:
         b3i) a linear camera having a first optical axis, an optical plane, a focal plane and an objective line belonging to the focal plane and to the optical plane, and
         b3ii) an illumination system adapted to illuminate the objective line, the illumination system comprising a light source and an optical lens system having a second optical axis,
   wherein the optical lens system comprises a first converging lens, proximal to the light source, and a second converging lens arranged on the side opposite the light source with respect to the first lens,
   wherein the light source, the first lens and the second lens are coaxial with the second optical axis,
   wherein the first lens has a numerical aperture greater than or equal to 0.5, and
   wherein an aperture of the second lens is greater than the numerical an aperture of the first lens.

2. The station according to claim 1, wherein the light source has an overall emitting surface inscribed in a circle with diameter less than or equal to 10 mm.

3. The station according to claim 2, wherein the circle has a diameter greater than or equal to 3 mm.

4. The station according to claim 1, wherein the light source has an emitting surface with an optical power density greater than or equal to 0.3 W/mm².

5. The station according to claim 1, wherein the light source is adapted to emit incoherent light.

6. The station according to claim 1, wherein the light source is an LED.

7. The station according to claim 1, wherein the light source has an emitting surface with circular shape.

8. The station according to claim 1, wherein the first lens has a numerical aperture greater than or equal to 0.6.

9. The station according to claim 1, wherein the aperture of the first lens has a diameter greater than or equal to 15 mm and smaller than or equal to 35 mm.

10. The station according to claim 1, wherein a rear focal length of the first lens is greater than or equal to 7 mm and smaller than or equal to 20 mm.

11. The station according to claim 1, wherein the first lens is aspherical.

12. The station according to claim 1, wherein the second lens has a front focal length greater than or equal to 80 mm and smaller than or equal to 200 mm.

13. The station according to claim 1, wherein the second lens has a numerical aperture smaller than or equal to 0.4.

14. The station according to claim 1, wherein the aperture of the second lens has a diameter greater than or equal to 30 mm and smaller than or equal to 60 mm.

15. The station according to claim 1, wherein the second lens has at least one spherical surface, preferably with curvature radius greater than or equal to 40 mm and less than or equal to 60 mm.

16. The station according to claim 15, wherein the spherical surface has a curvature radius greater than or equal to 40 mm and smaller than or equal to 60 mm.

17. The station according to claim 1, wherein the second lens is a plano-convex lens with a single convex surface facing the first lens.

18. The station according to claim 1, wherein the first lens and the second lens are positioned so that respective convex surfaces face each other.

19. The station according to claim 1, wherein a difference between a diameter of the aperture of the second lens and a diameter of the aperture of the first lens is:
   greater than or equal to 40% of the diameter of the aperture of the first lens, and
   smaller than or equal to 100% of the diameter of the aperture of the first lens.

20. The station according to claim 1, wherein a difference between a diameter of the aperture of the second lens and a diameter of the aperture of the first lens is:
   greater than or equal to 70% of a distance between a rear vertex of the first lens and a rear vertex of the second lens, and
   smaller than or equal to 130% of the distance between the rear vertex of the first lens and the rear vertex of the second lens.

21. The station according to claim 1, wherein a distance between a rear vertex of the first lens and a rear vertex of the second lens is fixed, and greater than or equal to 10 mm and less than or equal to 20 mm.

22. The station according to claim 1, wherein the illumination system comprises a system for regulating an axial distance between the light source and the first lens.

23. The station according to claim 1, wherein an axial distance between the light source and a rear vertex of the first lens is smaller than or equal to a rear focal length of the first lens.

24. The station according to claim 23, wherein a difference between the rear focal length and the axial distance between the light source and the rear vertex of the first lens, is greater than or equal to 5% of the rear focal length and smaller than or equal to 30% of the rear focal length.

25. The station according to claim 23, wherein an axial distance between a front vertex of the second lens and a point of intersection between the second optical axis and the focal plane is less than a front focal length of the second lens.

26. The station according to claim 23, wherein the illumination system defines an image plane of the light source lying at an axial distance from a front vertex of the second lens that is greater than or equal to a front focal length of the second lens.

27. The station according to claim 26, wherein a point of intersection between the image plane and the second optical axis, and a point of intersection between the second optical axis and the focal plane, are separated by at least 20 mm.

28. The station according to claim 1, wherein the second optical axis forms, with the optical plane, an angle that is less than or equal to 15° in absolute value.

29. The station according to claim 1, wherein the second optical axis intersects the first optical axis.

30. The station according to claim 1, wherein the second optical axis intersects the objective line.

31. A method for checking tyres, the method comprising:
a) arranging an acquisition system comprising:
   a linear camera having a first optical axis, an optical plane, a focal plane, and an objective line belonging to the focal plane and to the optical plane; and
   an illumination system adapted to illuminate the objective line, the illumination system comprising a light source and an optical lens system having a second optical axis,
   wherein the optical lens system comprises a first converging lens proximal to the light source, and a second converging lens arranged on a side opposite the light source with respect to the first converging lens,
   wherein the light source, the first converging lens and the second converging lens are coaxial with said second optical axis,
   wherein the first converging lens has a numerical aperture greater than or equal to 0.5; and
   wherein an aperture of the second converging lens is greater than an aperture of the first converging lens;
b) arranging a tyre to be checked having a surface and moving the acquisition system close to the tyre;
c) rotating the tyre with respect to the acquisition system in a manner that distinct linear surface portions of the tyre are successively situated in proximity to the objective line; and
d) successively acquiring, by means of the acquisition system, a series of respective linear images of the distinct linear surface portions to obtain an image of a circumferential surface region via combining of the series of respective linear images.

32. The method according to claim 31, wherein:
the circumferential surface region is a circumferential external surface region of at least one of: i) a shoulder, ii) a tread, and iii) a bead, of the tyre, and
the first optical axis is substantially radially arranged with respect to the tyre.

\* \* \* \* \*